(12) United States Patent
Parks et al.

(10) Patent No.: US 7,222,560 B2
(45) Date of Patent: May 29, 2007

(54) DUST COLLECTION ARRANGEMENT FOR A MITER SAW

(75) Inventors: James R. Parks, White Hall, MD (US); Brian P. Wattenbach, Columbia, MD (US); Steven McKeithen, Texarkana, TX (US); James H. Stiles, III, Shrewsbury, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/157,126

(22) Filed: Jun. 20, 2005

(65) Prior Publication Data

US 2005/0229757 A1   Oct. 20, 2005

Related U.S. Application Data

(63) Continuation of application No. 10/644,420, filed on Aug. 20, 2003, now abandoned.

(60) Provisional application No. 60/411,371, filed on Sep. 17, 2002.

(51) Int. Cl.
*B26D 7/18* (2006.01)
*B27B 5/29* (2006.01)

(52) U.S. Cl. ............................ 83/165; 83/478; 83/485; 83/490

(58) Field of Classification Search ............... 83/98, 83/100, 162, 165, 166, 478, 485, 490; 144/252.1, 144/252.2; 409/137; 451/451, 453, 456
See application file for complete search history.

(56) References Cited

U.S. PATENT DOCUMENTS

| | | | | | |
|---|---|---|---|---|---|
| 4,694,721 | A | * | 9/1987 | Brickner | 83/471.3 |
| 5,752,421 | A | * | 5/1998 | Chang | 83/397 |
| 5,782,153 | A | | 7/1998 | Sasaki et al. | |
| 5,927,171 | A | * | 7/1999 | Sasaki et al. | 83/165 |
| 5,931,072 | A | | 8/1999 | Shibata | |
| 6,167,626 | B1 | * | 1/2001 | Doumani et al. | 30/124 |
| 6,415,699 | B1 | * | 7/2002 | Bettacchini et al. | 83/397 |
| 6,510,772 | B2 | * | 1/2003 | Brickner et al. | 83/100 |
| 6,662,695 | B2 | * | 12/2003 | Bettacchini et al. | 83/397 |
| 6,742,425 | B2 | * | 6/2004 | Oktavec et al. | 83/100 |
| 2002/0104416 | A1 | * | 8/2002 | Brickner et al. | 83/100 |

FOREIGN PATENT DOCUMENTS

DE   100 36 458 A1   3/2001

OTHER PUBLICATIONS

U. Frisch, European Search Report, May 12, 2005, Munich.
U. Frisch, Annex to the European Search Report on European Patent Application No. EP 05 00 6746.

* cited by examiner

*Primary Examiner*—Clark F. Dexter
(74) *Attorney, Agent, or Firm*—Adan Ayala

(57) ABSTRACT

A miter saw includes a base, a table rotatably attached to the base, a support housing connected to the table, a saw assembly connected to the support housing, the saw assembly comprising a pivot arm, an upper blade guard connected to the pivot arm, a motor attached to the upper blade guard, and a blade driven by the motor, and a dust collector having a main body, wherein at least one slot is disposed on the main body.

3 Claims, 2 Drawing Sheets

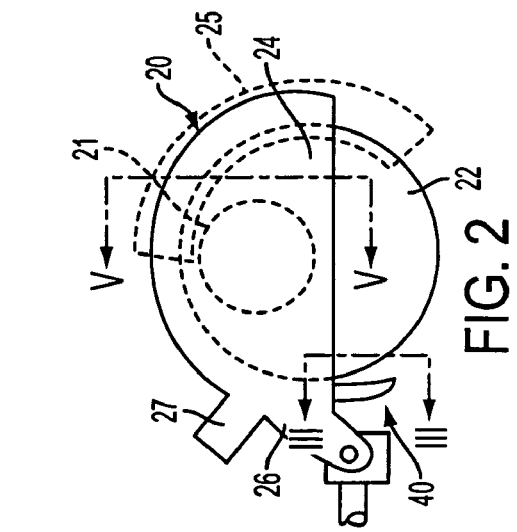
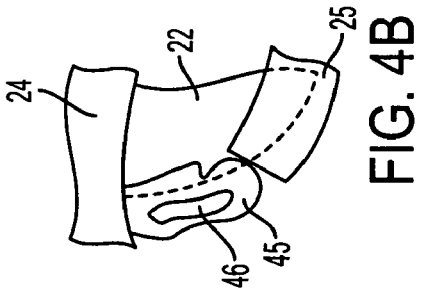
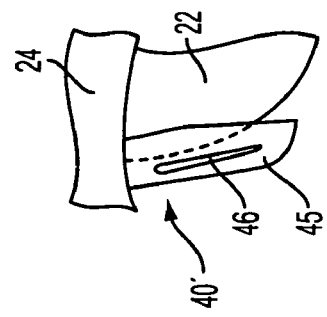
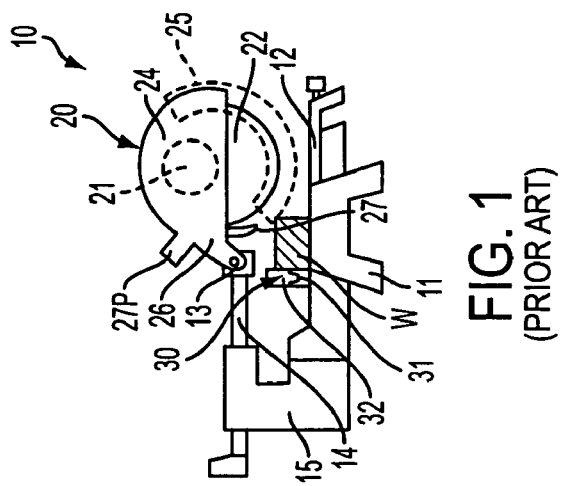
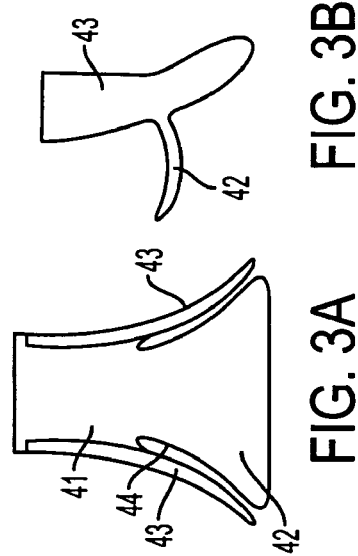
FIG. 1 (PRIOR ART)
FIG. 2
FIG. 3A
FIG. 3B
FIG. 4A
FIG. 4B

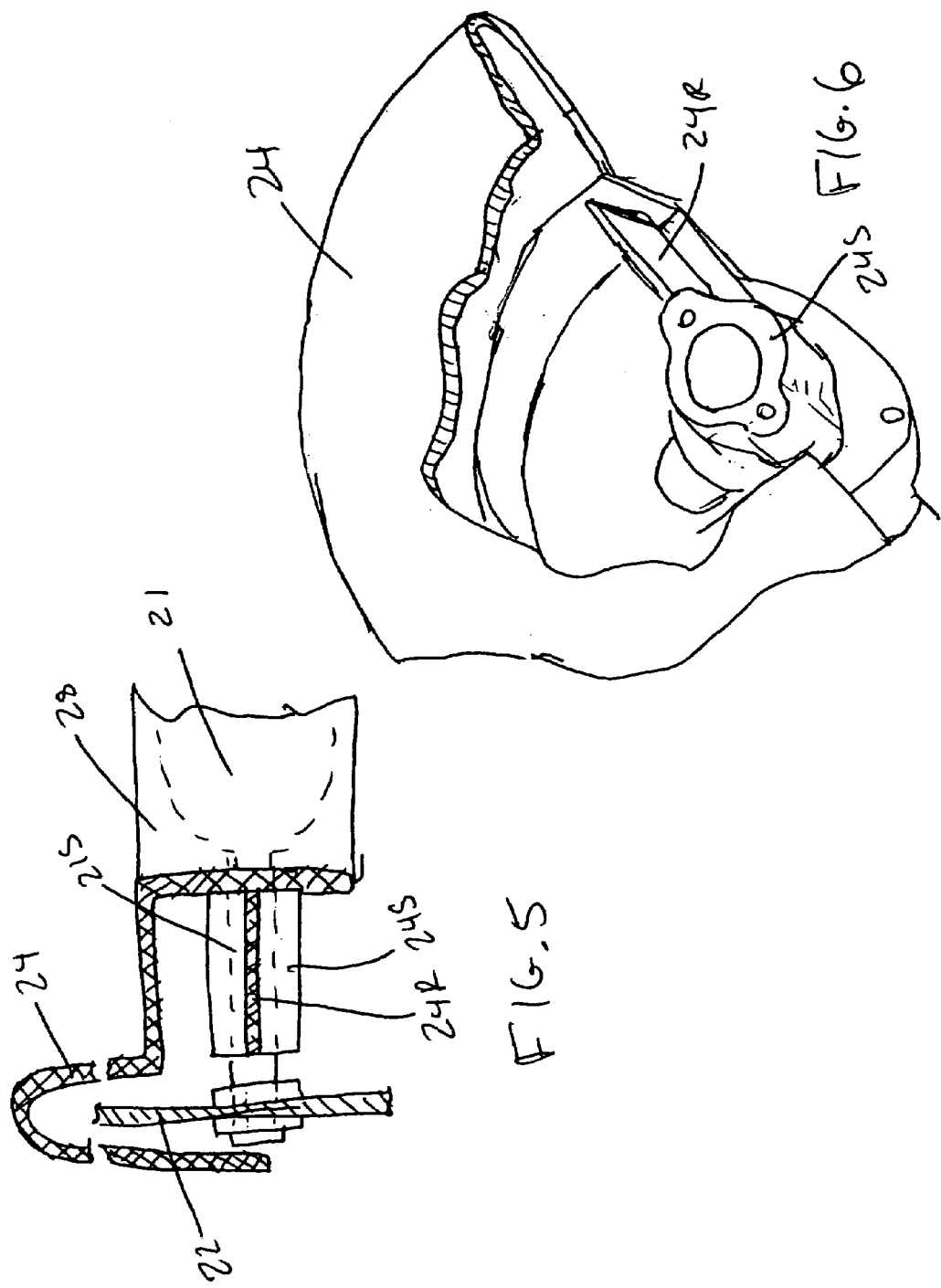

DUST COLLECTION ARRANGEMENT FOR A MITER SAW

This application is a continuation application of U.S. application Ser. No. 10/644,420, filed Aug. 20, 2003, now pending, which in turn claims the benefit of U.S. Provisional Application No. 60/411,371, filed Sep. 17, 2002, now pending.

FIELD OF THE INVENTION

This invention relates generally to miter saws and in particular to dust collection arrangements for miter saws.

BACKGROUND OF THE INVENTION

Referring to FIG. 1, non-sliding and slide miter saws both have a base 11, a rotatable table 12 attached to the base 11, a saw assembly 20 including a motor 21, a blade 22 driven by the motor 21, a cover housing (not shown) covering motor 21, an upper blade guard 24 covering the upper part of blade 22, and a lower guard 25 (shown in broken lines) pivotably attached to upper blade guard 24 for covering the lower part of blade 21. Accordingly, the saw assembly 20 is pivoted downwardly for cutting a workpiece disposed on the base 11 and table 12.

In addition, slide miter saws enable the user to move the saw assembly horizontally along the table. Most slide miter saws accomplish this by connecting the upper blade guard 24 (and thus the saw assembly 20) to a pivot arm 26, which in turn is connected to a trunnion 13, which is fixedly connected to at least one rail 14, which is slidably attached to a support housing 15 connected to the table 12 (see, e.g., U.S. Pat. No. 6,067,885). With such arrangement, the user would pull the saw assembly 20 forwardly, move the saw assembly 20 downwardly, then push the saw assembly 20 rearwardly for cutting a workpiece W.

The miter saw may also have a movable fence assembly 30 attached to the base 11. Movable fence assembly 30 may extend laterally across table 12, against which workpiece W can be positioned and supported for performing the cutting operation thereon. Movable fence assembly 30 typically includes a fixed fence 31 attached to base 11, and a movable fence 32 connected to the fixed fence 21. Usually, movable fence 32 is slidably attached to fixed fence 31. Persons skilled in the art are referred to U.S. Pat. Nos. 5,297,463 and 5,943,931, which are wholly incorporated by reference herein.

Some miter saws include dust collection flaps 27 for directing the dust resulting from the cutting operation through pivot arm 26 and/or upper blade guard 24, which then exits through dust port 27P. Some typical dust collection flaps 27 are made of rubber or other resilient materials.

The invention is now described with reference to the accompanying figures, wherein like numerals designate like parts. Referring to FIGS. 1–2, a slide miter saw 10 preferably has a base 11, a table 12 rotatably connected to the base 11, a support housing 15 pivolally connected to table 12, at least one (and preferably two) rail(s) 14 slidably connected to the sapport housing 15, arid a saw assembly 20 which comprises a trunnion 13 attached to one end of the rail(s) 14, a pivot arm 26 pivotably attached to trunnion 13, a motor 21, a blade 22 driven by the motor 21, an upper blade guard 24 for covering an upper part of blade 22, and a lower blade 25 pivotally attached to the upper blade guard 24 for covering a lower part of blade 22 Preferably the motor 21 is attached to the upper blade guard 24. These elements are well known in the art. Persons skilled in the art are referred to U.S. Pat. No. 6,067,885, which is wholly incorporated by reference herein.

SUMMARY OF THE INVENTION

In accordance with the present invention, an improved miter saw is employed. The miter saw includes a base, a table rotatably attached to the base, a support housing connected to the table, a saw assembly connected to the support housing, the saw assembly comprising a pivot arm, an upper blade guard connected to the pivot arm, a motor attached to the upper blade guard, and a blade driven by the motor, and a dust collector having a main body, wherein at least one slot is disposed on the main body.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 1 is a side view of a typical prior art slide miter saw;

FIG. 2 is a partial side view of a saw assembly according to the invention;

FIG. 3 illustrates a first embodiment of a dust collector according to the invention, where FIG. 3A is a front view of the dust collector along line III—III of FIG. 2 and FIG. 3B is a side view of the dust collector in a bent position;

FIG. 4 illustrates a second embodiment of a dust collector according to the invention, where FIGS. 4A–4B are side views of the dust collector with the lower blade guard in non-contacting and contacting positions, respectively;

FIG. 5 is a partial cross-sectional view along line V—V of FIG. 2; and

FIG. 6 is a partial perspective view of the arrangement shown in FIG. 5.

DETAILED DESCRIPTION

The invention is now described with reference to the accompanying figures, wherein like numerals designate like parts. Referring to FIGS. 1–2, a slide miter saw 10 preferably as a base 11, a table 12 rotatably connected to the base 11, a support housing pivotally connected to table 12, at least one (and preferably two) rail(s) 14 slidably connected to the support housing 15, and a saw assembly which comprises a trunnion 13 attached to one end of the rail(s) 14, a pivot arm 26 pivotably attached to trunnion 13, a motor 21, a blade 22 driven by the motor 21, an upper blade guard 24 for covering an upper part of blade 22, and a lower blade 25 pivotally attached to the upper blade guard 24 for covering a lower part of blade 22. Preferably the motor 21 is attached to the upper blade guard 24. These elements are well known in the art. Persons skilled in the art are referred to U.S. Pat. No. 6,067,885, which is wholly incorporated by reference herein.

Referring to FIGS. 2–3, a dust collector assembly 40 may be attached to the upper blade guard 24 and/or pivot arm 26 for directing the dust resulting from the cutting operation through pivot arm 26 and/or upper blade guard 24. The dust preferably then exits through dust port 27. Dust collector assembly 40 may be made of rubber or any other resilient material.

A first embodiment of dust collector assembly 40 is shown in FIG. 3. Dust collector assembly 40 may have a main body 41, side walls 43, and a lower portion 42.

Dust collector assembly may also have at least one slot 44 extending from main body 41 to the outer edge of dust collector assembly 40. Persons skilled in the art shall recognize that slots 44 are preferably through slots. In other words, the slots 44 preferably extend between opposing faces of dust collector assembly 40.

Preferably the slots 44 are disposed between the side walls 43 and the lower portion 42 to allow lower portion 42 to fold either forwardly or rearwardly (as shown in FIG. 3B) when passing over an obstruction, a workpiece, etc.

Persons skilled in the art should recognize that slots 44 may be disposed anywhere on dust collector assembly 40. It is however preferable to not place the slots in the middle (or vertical centerline) of main body 41 as some dust may escape through the slots. However, such placement is still within the scope of the present invention.

Providing at least one slot 44 may also allow different parts of dust collector assembly 40 to move relative to each other when compressed by the lower blade guard 25, so that it does not expose the outer circumference of blade 22.

Another embodiment of dust collector assembly 40' is shown in FIG. 4. The teachings of the previous embodiment are wholly incorporated herein. As before, dust collector assembly 40' has a body 45 with at least one slot 46 disposed thereon. The main difference between the two embodiments is that slot(s) 46, unlike slot 44, do(es) not reach the outer edge of body 45. Nevertheless, providing at least one slot 46 allows different parts of dust collector assembly 40' to move relative to each other when compressed by the lower blade guard 25, so that it does not expose the outer circumference of blade 22, as shown in FIG. 4 and more specifically in FIG. 4B.

Again, persons skilled in the art shall recognize that slots 46 are preferably through slots. In other words, the slots 46 preferably extend between opposing faces of dust collector assembly 40'.

The upper blade guard 24 may incorporate another feature to assist in the collection of dust. Referring to FIGS. 2 and 5–6, upper blade guard 24 may have a shaft support 24S for supporting a shaft 21S which may be driven by motor 21 and/or supports blade 22. Upper blade guard 24 may also support a motor housing 28 which encloses motor 21.

Upper blade guard 24 may have a rib 24R for limiting the amount of dust entering upper blade guard 24. Preferably, rib 24R is substantially perpendicular to the plane defined by blade 22. In addition, a plane defined by rib 24R may intersect the axis of rotation of shaft 21S and/or blade 22. Accordingly, rib 24R may prevent some dust or wood chips from entering the upper blade guard 24.

Rib 24R may also preferably shaped so that it affects the airflow within upper blade guard 24. Preferably, rib 24 is substantially flat. By placing it as described above, it would help direct the dust or wood chips that entered into the upper blade guard 24 towards dust port 27.

Persons skilled in the art shall recognize that shaft support 24S and rib 24R may be separable from or integrally build into upper blade guard 24. In addition, persons skilled in the art should recognize that shaft support 24S and rib 24R may be built integrally together.

Persons skilled in the art may recognize other additions or alternatives to the means disclosed herein. However, all these additions and/or alterations are considered to be equivalents of the present invention.

What is claimed is:

1. A miter saw comprising:
   a base;
   a table rotatably attached to the base;
   a support housing connected to the table;
   a saw assembly connected to the support housing, the saw assembly comprising a pivot arm, an upper blade guard connected to the pivot arm, a lower blade guard connected to the upper blade guard, a motor attached to the upper blade guard, and a blade driven by the motor; and
   a resilient dust collector for directing dust from a cutting operation performed by the blade, the dust collector having a main body, wherein a first slot is disposed on and through the main body, the lower blade guard being movable relative to the blade to cover and uncover the blade, the dust collector disposed in the path of said movement of the lower blade guard and resiliently deforming when contacted by the lower blade guard without exposing an outer circumference of the blade.

2. The miter saw of claim 1, wherein the main body has a second slot.

3. The miter saw of claim 2, wherein the main body has a flexible lower portion partly delimited by the first and second slots.

* * * * *